United States Patent

Arai et al.

[11] Patent Number: 6,049,196
[45] Date of Patent: Apr. 11, 2000

[54] GENERATOR FOR INTERNAL COMBUSTION ENGINE

[75] Inventors: Hideaki Arai; Kazuyuki Kubo; Seiichi Kuroda; Tadashi Fujiwara; Shinsuke Nagano; Takuya Fujita, all of Saitama, Japan

[73] Assignee: Honda Giken Kogyo Kabushiki Kaisha, Tokyo, Japan

[21] Appl. No.: 09/142,222

[22] PCT Filed: Jan. 13, 1998

[86] PCT No.: PCT/JP98/00085

§ 371 Date: Sep. 3, 1998

§ 102(e) Date: Sep. 3, 1998

[87] PCT Pub. No.: WO98/31089

PCT Pub. Date: Jul. 16, 1998

[30] Foreign Application Priority Data

Jan. 13, 1997 [JP] Japan .................................. 9-015859
Jan. 13, 1997 [JP] Japan .................................. 9-015860

[51] Int. Cl.[7] .................................. H02P 9/10; H02H 7/06
[52] U.S. Cl. .................................. 322/61; 322/29
[58] Field of Search .................................. 322/29, 61, 32

[56] References Cited

U.S. PATENT DOCUMENTS

| 4,229,689 | 10/1980 | Nickoladze | 322/32 |
| 4,246,531 | 1/1981 | Jordan | 322/28 |
| 4,510,433 | 4/1985 | Gamze et al. | 322/32 |
| 5,418,446 | 5/1995 | Hallidy | 322/28 |

FOREIGN PATENT DOCUMENTS

| 2-87999 | 3/1990 | Japan . |
| 6-113479 | 4/1994 | Japan . |
| 7-255200 | 10/1995 | Japan . |

*Primary Examiner*—Nestor Ramirez
*Assistant Examiner*—Peter Medley
*Attorney, Agent, or Firm*—Armstrong, Westerman, Hattori, McLeland & Naughton

[57] ABSTRACT

An induction machine used as a power generator for an internal combustion engine, and which generates a predetermined power regardless of a rotation speed of a rotor of the induction machine and the engine. A power P to be generated is controlled so as to be equal to an upper limit value Pmax or less, a lower limit value or more or, equal to a target value Pc. The power generation control is achieved in the following manner. A speed N2 of the rotating magnetic field electrically generated with a three-phase winding of the rotor 1R is controlled in accordance with the mechanical rotation speed N1 of the rotor 1R in order that a relative speed N of the rotating magnetic field generated in the rotor with respect to a stator coil is kept at an upper limit speed Nmax or less, a lower limit speed Nmin or more, or a target relative speed Nc.

12 Claims, 10 Drawing Sheets

GENERATOR FOR INTERNAL COMBUSTION ENGINE

BACKGROUND OF THE INVENTION

1. Field of the Invention

This invention relates to a generator system for internal combustion engines which converts rotational energy into electrical energy and, more particularly, to a generator system for an internal combustion engine, which can optimize a driving torque and a generated power (energy) of a generator by generating a rotating magnetic field in a polyphase winding of a rotor regardless of an internal combustion engine speed, that is, a rotation speed of the rotor.

2. Description of the Related Art

A generator system for vehicles or ships includes an alternator (AC generator; ACG) with its rotating shaft coupled through an alternator belt to a crankshaft of an engine; a rectifier for converting AC power into DC power, the AC power generated by the alternator according to the engine speed; and a regulator for controlling the voltage level of the DC power according to the voltage at a battery.

FIG. 9 is a schematic diagram showing a structure of a conventional alternator 50, in which a DC field coil 53 is wound around a rotor 52 integrally formed with the rotating shaft and a three-phase coil 55 is wound around a stator 54. In the condition that the DC field coil 53 is excited by supplying direct current from the battery (not shown), the rotor 52 is rotated to create an alternating magnetic field. Consequently, the three-phase coil 55 of the stator 54 generates AC power with a frequency corresponding to the rotational speed of the rotor 52. Such a conventional alternator is an AC generator using a synchronous motor. In some cases, the rotor 52 may be provided with a permanent magnet instead of the DC field coil 53.

In recent vehicles, power consumption has increased because of current tendencies to electrify or electronically control vehicle parts including the engine and to widely use audio and navigation systems. This requires the alternator to increase the capacity of power generation. The electric power generated by the alternator is reduced as its rotation speed drops. It is therefore necessary to increase the ratio of the alternator speed to the engine speed so that sufficient generated power can be obtained even at low engine speeds such as 1000 r.p.m or less. In many cases, the pulley ratio is set twice or more for that purpose.

On the other hand, high velocity revolution and low idling of the engine is accelerated as the engine output and efficiency increase. For this reason, the ratio of the minimum and maximum engine speeds is becoming larger. When the pulley ratio is set higher for the electric power required at low engine speeds, the alternator speed tends to exceed the maximum rate determined from mechanical restrictions in high velocity revolution. In the case where a pulley ratio is set to a higher value, a power generated by the alternator is greater than the maximum power required, during high rotation of the engine. For this reason, a problem has arisen such that wiring and couplers or the like with larger capacity must be used.

On the other hand, in the case where the pulley ratio is set to a lower value so as to meet the desired generated power, during high rotation of an engine, a sufficient power is not generated during a lower rotation. For this reason, a problem has arisen such that a battery is excessively discharged because a power consumption due to an electric load becomes greater than the generated power.

As described above, in the generator system for an internal combustion engine which is operated at variable speed like an engine for vehicle, there has arisen a problem that it is difficult to properly set a pulley ratio in the light of durability of the alternator, capacity of wiring and the couplers or the like, and charge and discharge of the battery.

In order that the rotation speed of alternator is arbitrarily set regardless of the engine speed, for example, in Japanese Patent Publication No. Sho 62-33465, there has been proposed the mechanism for mechanically varying a pulley diameter of an alternator driving pulley. However, in the case where the aforesaid mechanical speed change mechanism is employed, a problem has arisen such that the structure or construction becomes complicate and is large in size.

In an internal combustion engine for vehicle and the like, when an electric load such as a headlight and an air conditioner having a much power consumption is turned on/off, in response to the electric load variation, an excitation power of a direct current field coil 53 is controlled in order to increase/decrease a generated power. As a result, an engine torque (herein after, referred simply to as "driving torque for alternator") required for driving the alternator varies, and then the rotation speed of engine varies. In particular, when a heavy electric load is changed from an off state to an on state and the driving torque suddenly increases, the rotation speed of engine is lowered. For this reason, if the engine is in an idling state, an engine stall (stop) may be caused, or if a vehicle is in a running state, the engine becomes in a kind of braking state and the driverability becomes worse.

In order to solve the above problems, for example, in Japanese patent Laid-open Publication No. Hei 1-277650, there has been proposed a control unit which makes a decision whether or not an electric load is applied, and opens a throttle valve so as to make high a preset value of an engine speed, if a decision is made that the heavy electric load is applied. Further, in Japanese Patent Laid-open Publication No. Hei 5-180047, there has been disclosed a control unit which controls a duty ratio of a field current supplied to a field coil of a stator in response to an increase and decrease in an electric load. According to the aforesaid conventional techniques, a driving torque for an alternator varies in accordance with an increase or a decrease of the electric load; for this reason, there has arisen a problem that a large amount of load is applied to an alternator belt, or no stability is obtained in the engine speed because quick control thereof is not performed.

SUMMARY OF THE INVENTION

An object of the present invention is to provide a generator system for an internal combustion engine, which uses an induction machine (machine) as an alternator, and can generate a predetermined power regardless of a rotation speed of the internal combustion engine.

Another object of the present invention is to provide a power generator for an internal combustion engine, which uses an induction machine (machine) as an alternator, and can arbitrarily control a driving torque for the alternator even if there is a fluctuation of an electric load or an engine speed, that is, a factor of varying the driving torque for the alternator.

The present invention has the following features in a generator system including an induction machine having a rotor with a polyphase winding which rotor is rotated with transmitted rotating motion of an internal combustion engine; rotating magnetic field generation means for inducing a rotating magnetic field in the polyphase winding of the rotor; and control means for controlling a speed of the rotating magnetic field.

(1) The control means controls a speed of the rotating magnetic field generated in the rotor in accordance with a rotational speed of the rotor so that a generated power of the induction machine is kept within a predetermined range. According to this feature, it is possible to keep the power generated by the induction machine within a predetermined range regardless of a rotation speed of the internal combustion engine.

(2) The control means controls a speed of the rotating magnetic field generated in the rotor in accordance with a rotation speed of the rotor so that a driving torque of the induction machine is kept within a predetermined range. According to this feature, it is possible to keep the driving torque for the induction machine within a predetermined range regardless of a rotation speed of the internal combustion engine.

(3) The control means controls the speed of the rotating magnetic field as a function of a temperature. When a temperature of the induction machine lowers, an electrical resistance of the polyphase winding lowers and more exciting current flows. For this reason, a relationship between the driving torque or the electric power generated by the induction machine and a relative speed of the rotating magnetic field in the rotor to that in the stator is not uniquely determined. However, according to this feature, temperature compensation is possible; therefore, it is possible to accurately control the driving torque and the power generated by the induction machine regardless of the temperature variation.

(4) The control means generates in the rotor a rotating magnetic field increasing the relative speed if a charging quantity in a battery charged by the induction machine is insufficient, while generating a rotating magnetic field decreasing the relative speed if the charging quantity in the battery is sufficient. According to this feature, if the charging quantity in the battery is insufficient, the relative speed is increased so as to increase the generated power; on the other hand, if the charging quantity is sufficient, the relative speed is reduced to decrease the generated power. Therefore, the charging quantity in the battery can be properly maintained.

(5) The control means controls the rotating speed of the magnetic field so that the power generated by the induction machine is not less than power consumption due to the electric load. According to this feature, it is possible to prevent the charging quantity in the battery from lowering.

(6) The control means controls the speed of the rotating magnetic field in accordance with vehicle running condition. For example, if the vehicle is in a braking state, the control means controls the speed of the rotating magnetic field so that the driving torque for the induction machine increases. On the other hand, if the vehicle is in an accelerating state, the control means controls the speed of the rotating magnetic field so that the driving torque for the induction machine decreases. According to the features, an engine brake operation is improved in the braking condition, and accelerating performance is improved in an accelerating condition.

(7) When the electric load varies, the control means first responds to the load variation for controlling the speed of the rotating magnetic field so that the electric load, having varied, is sufficiently powered without causing a driving torque variation. Thereafter, the control means gradually controls a rotating magnetic field accompanying with the driving torque variation so that the electric load after varied is compensated even if a relative speed of the rotating magnetic field with respect to the stator is a predetermined rotation speed. According to thus feature, even if the electric load increases and decreases, it is possible to perform an ideal control for generated power without feeling the driving torque variation.

(8) The predetermined rotation speed is set to a rotation speed within a region where the induction machine has the highest power generation efficiency. According to this feature, an effective power generation is performed.

DETAILED DESCRIPTION OF THE PREFERRED EMBODIMENTS

The basic idea of the present invention will be first described. An effective rotation speed of an induction machine can be represented by a relative speed N of a rotating magnetic field generated by a rotor to a stator coil.

If the field winding (polyphase winding) of the rotor generates a direct current field, and not a rotating magnetic field, a relative speed N coincides with a mechanical rotation speed of the rotor. Meanwhile, in the case where the rotating magnetic field is generated in the polyphase winding of the rotor, assuming that the mechanical rotation speed of the rotor is set as N1, and a speed of the rotating magnetic field generated in the polyphase winding of the rotor is set as N2, the aforesaid relative speed N is expressed by the following equation (1).

$$N=N1+N2 \qquad (1),$$

The relative speed N of the rotating magnetic field generated by the rotor to the stator coil in the induction machine will become faster than the mechanical rotation speed N1 of the rotor if the mechanical rotating direction of the rotor agrees with the rotating direction of the rotating field generated by the field coil of the rotor. If the directions become opposite to each other, on the contrary the relative speed N will be slower than the mechanical rotation speed N1 of the rotor. In a case such an induction machine is used as an alternator for vehicles, the relative speed N can be set equal to the maximum efficiency speed of rotation Nx at all times irrespective of the mechanical rotation speed N1 of the rotor by controlling the rotation speed N2 of the rotating magnetic field provided by the field coil according to the change in the mechanical rotation speed N1 of the rotor that depends on the engine speed. This makes it possible to arbitrarily control the relative speed N substantially.

Figure 3:
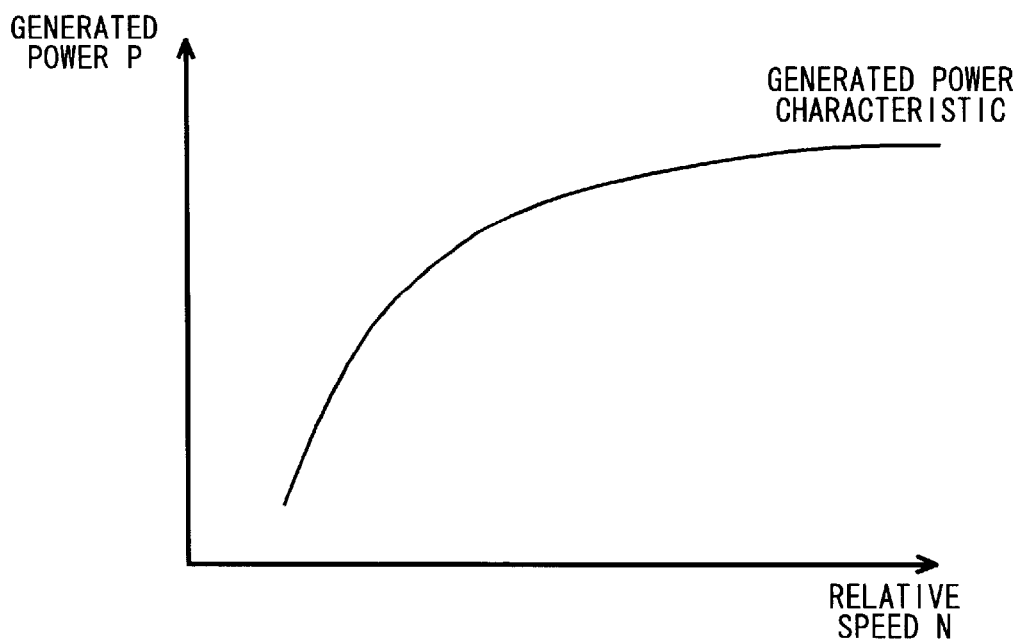
FIG. 3 is a graph showing a relationship between a relative speed N of rotating magnetic field and a generated power P.

As shown in FIG. 3, the generated power P of the alternator is a function of the relative speed N. Thus, if the relative speed N of the rotating magnetic field is arbitrarily controlled, the generated power P of the alternator can be also arbitrarily controlled regardless of the mechanical rotation speed N1 of the rotor.

Figure 4:
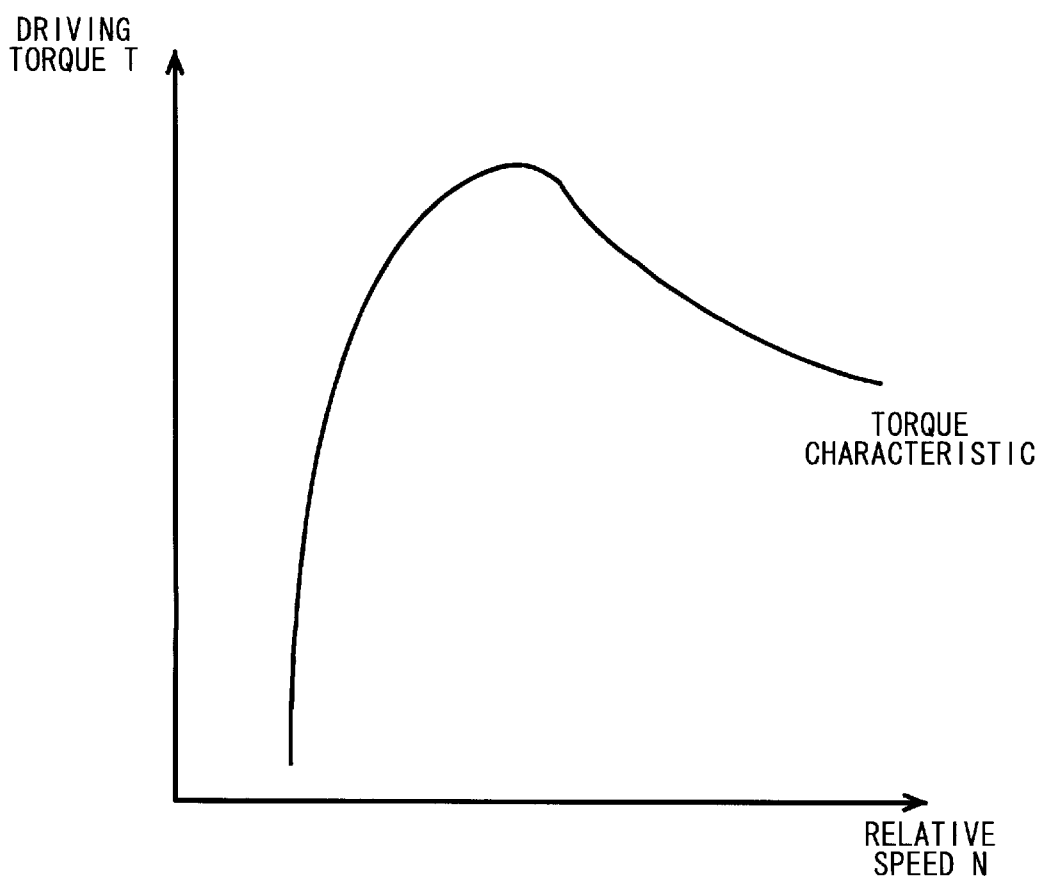
FIG. 4 is a graph showing a relationship between a relative speed N of rotating magnetic field and a driving torque T.

Likewise, the driving torque T of the alternator is a function of the relative speed N, as shown in FIG. 4. Thus, if the relative speed N of the rotating magnetic field is arbitrarily controlled, the driving torque T of the alternator can be also arbitrarily controlled regardless of the mechanical rotation speed N1 of the rotor.

The present invention has referred to the following matters: the electric power generated and the driving torque T produced by the induction machine are both functions of the relative speed N of the rotating magnetic field with respect to the stator; if the speed N2 of the rotating magnetic field generated in the polyphase winding of the rotor is controlled, the relative speed N can be arbitrarily controlled regardless of the mechanical rotation speed N1 of the rotor: for arbitrarily controlling the generated power and/or the driving torque T of the induction machine in accordance with vehicle condition.

Figure 1:
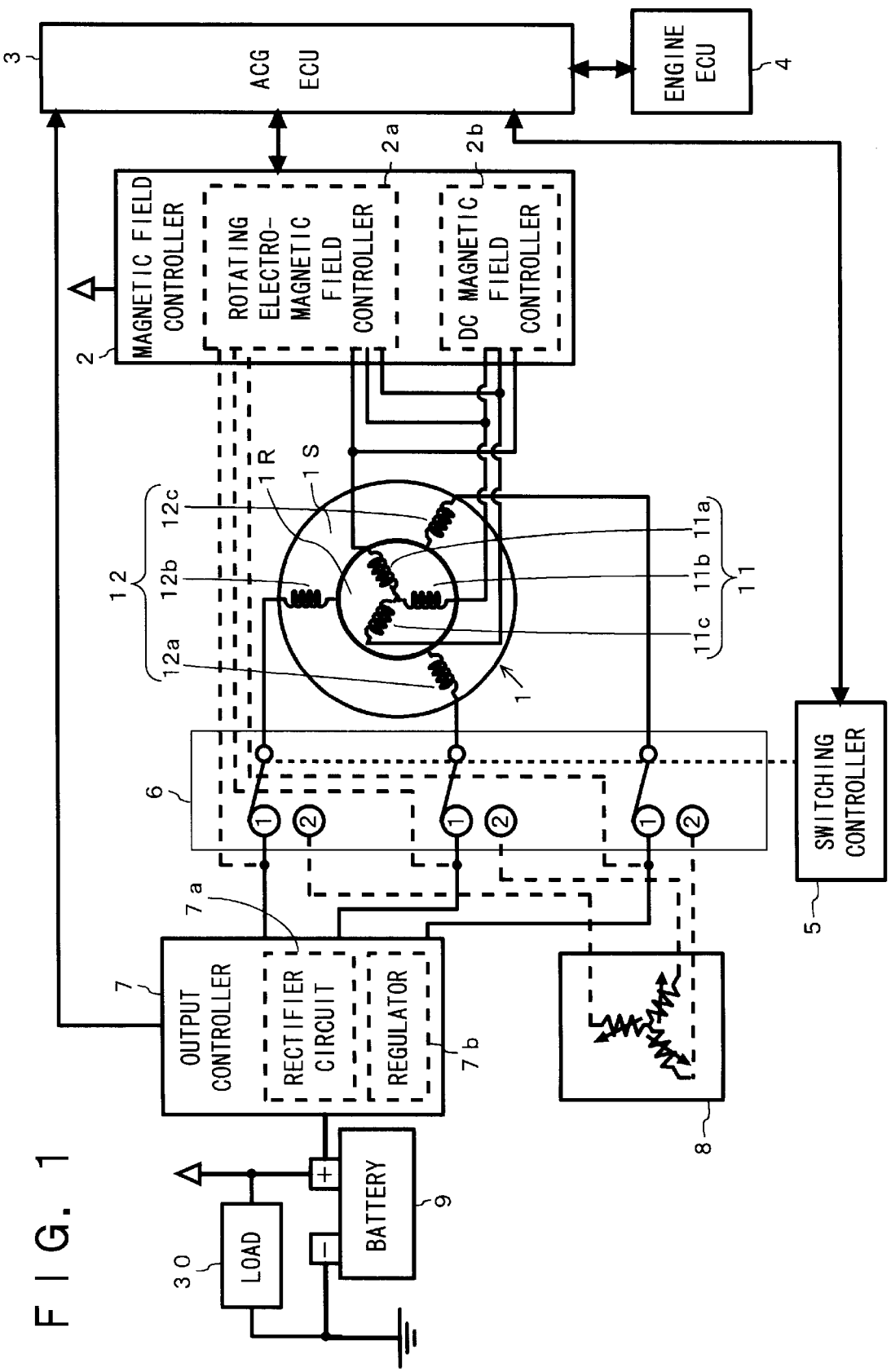
FIG. 1 is a block diagram of a generator system for vehicles according to an embodiment of the present invention.
Figure 2A:
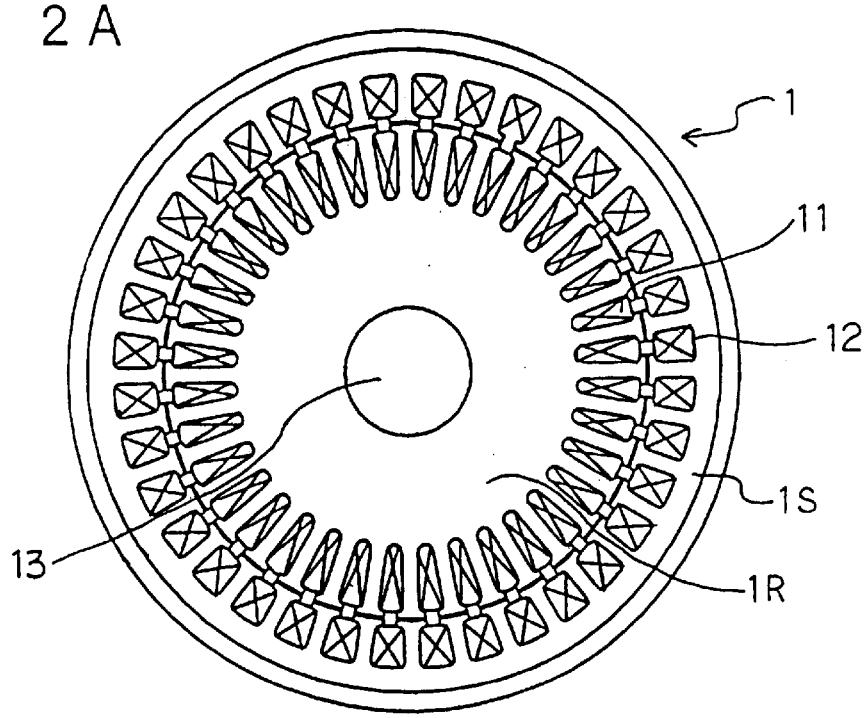
FIGS. 2A and 2B are diagrams showing a structure of an alternator according to the present invention.
Figure 2B:
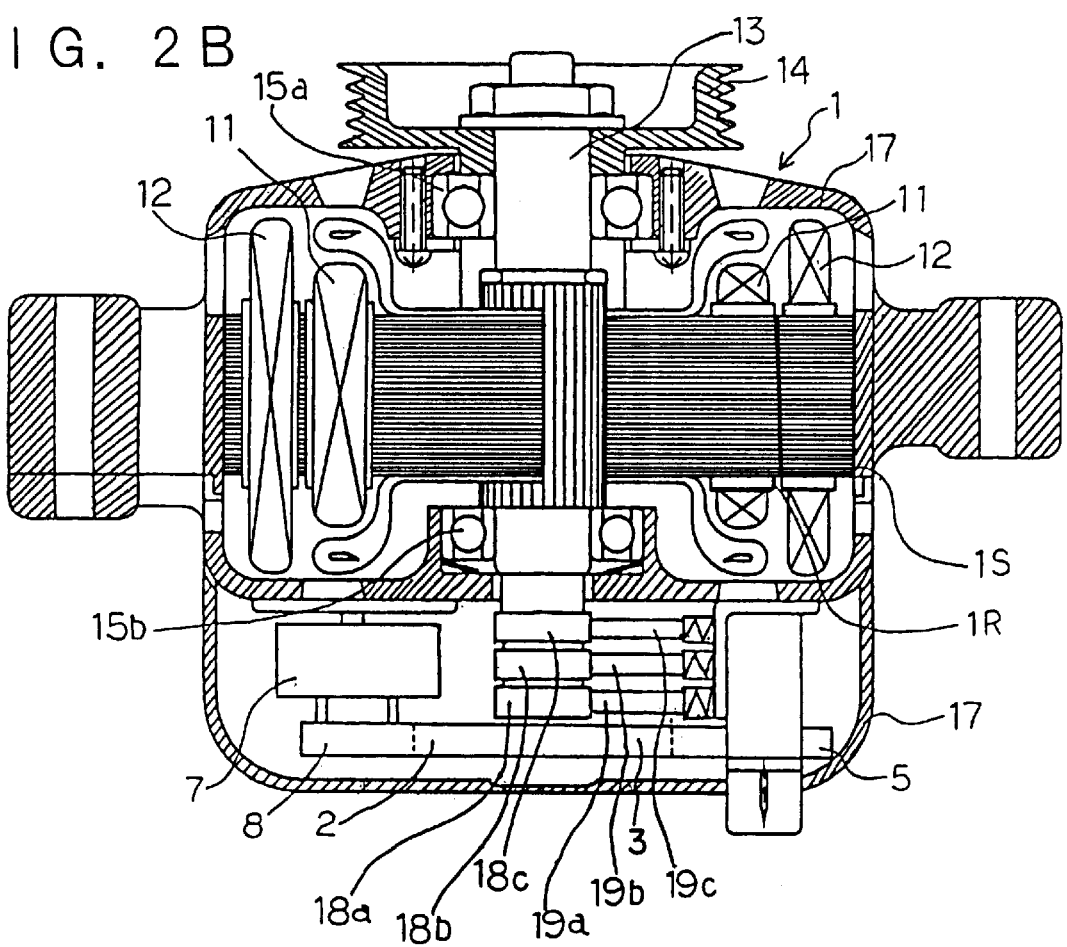

Referring next to the drawings, preferred embodiments of the present invention will be described. FIG. 1 is a block diagram showing an arrangement of main parts of a generator system for vehicles according to an embodiment of the present invention. FIGS. 2A and 2B show a structure of an alternator 1 constituting the generator system of the present invention. The alternator 1 of the present invention is an induction machine comprising rotor 1R and stator 1S where three-phase field coils 11 and three-phase armature windings 12 are formed, respectively.

In FIGS. 2A and 2B, the rotor 1R with the three-phase field coil 11 is coaxially fixed to a rotating shaft 13 of the alternator 1 and the stator 1S with the three-phase armature winding 12 is arranged around the rotor 1R. The rotating shaft 13 is rotatably supported in a housing 17 by a front bearing 15a and a rear bearing 15b. The rotating shaft 13 has a pulley 14 fixed at one end and slip rings 18a–18c formed at the other end to contact brushes 19a–19c for supplying exciting current to the field coils 11 (11a–11c) of the rotor 1R.

As will be described later, a magnetic field controller 2, an ACG•ECU (Electronic Control Unit) 3, a switching controller 5 and a short-circuit device 8 are also arranged inside the alternator housing 17 and at the other end of the rotating shaft 13. These devices 2, 3, 5 and 8 are disposed in the circumferential direction of the inside of the housing 17 and on a single plane perpendicular to the rotating shaft 13 (Preferably, on the inner surface of the housing 17). This makes it easier to wire between such devices and hence possible to ensure effective utilization of the dead space, thus preventing the alternator from increasing in size.

In FIG. 1, the ACG•ECU 3 functions as control means for controlling a speed of rotating magnetic field. When communicating with an engine ECU 4 for detecting an engine speed Ne, the electric load and the like, the ACG•ECU 3 determines the speed N2 of the rotating magnetic field to be generated in the three-phase field coil 11 of the rotor 1R, an applied voltage, a rotating magnetic field phase or the like, and then, transmits the determined results to an electrical rotating magnetic field generating section 2a of a magnetic field controller 2. The electrical rotating magnetic field generating section 2a controls phase, amplitude and frequency of the AC power to be supplied to the field coils 11a, 11b and 11c of the rotor 1R based on the data such as the speed N2 of the rotating field sent from the ACG•ECU 3 so that the rotating electromagnetic field with the rotation speed N2 will be generated.

The switching controller 5 communicates with the ACG•ECU 3 to detect the operating state of the alternator 1 for each contacts as follows: each output terminal of the alternator 1 is connected to each contact ① of an output controller 7 each time the alternator 1 is operated as a generator or to each contact ② of the short-circuit device 8 each time the alternator 1 is operated as a motor. In some cases, the switching controller 5 may resupply some of generated power for self-excitation to the alternator 1 through the electrical rotating magnetic field generating section 2a each time the alternator 1 is operated as a generator.

The output controller 7 is provided with rectifier circuit 7a and regulator 7b for converting AC power output from the alternator 1 into DC power corresponding to the voltage at the battery 9 and an electrical load 30. The short-circuit device 8 makes each output terminal of the armature windings 12a, 12b and 12c in the alternator 1 short-circuited either through each variable resistor or without such resistors. A DC magnetic field controller 2b is energized selectively instead of the electric rotating magnetic field generating section 2a to supply a DC current to the field coils 11a and 11b of the rotor 1R so that a magnetic field will be generated in the rotor 1R.

In operation, the ACG•ECU 3 receives operational parameters such as the engine speed Ne and the engine load detected at the engine ECU 4 to calculate the mechanical rotation speed N1 of the rotor 1R in the alternator 1 based on the parameters such as the engine speed Ne and the pulley ratio. In order to control the relative speed N of the rotating magnetic field generated by the rotor 1R with respect to the stator 1S, the ACG•ECU 3 calculates the speed N2 of the rotating magnetic field to be electrically generated in the three-phase winding 11 of the rotor 1R, and then, transmits the calculated results to the electrical rotating magnetic field generating section 2a.

The electrical rotating magnetic field generating section 2a controls excitation timing in each phase of the three-phase coil 11 of the rotor 1R to generate a rotating magnetic field with the rotation speed N2. The AC power from each armature windings 12a, 12b and 12c of the stator is converted into DC power in the output controller 7, where some of generated power is supplied to electrical load 30 and the remaining is charged to the battery 9. Since the control method for the induction machine itself is well known in the art, the description in more detail is omitted.

Figure 5:
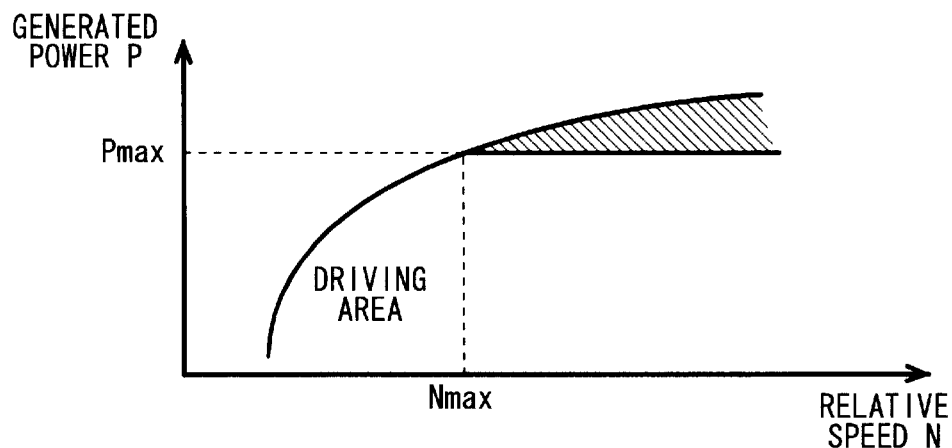
FIGS. 5, 6 and 7 are charts to respectively show a method for controlling a generated power according to the present invention.

The embodiments of power generation control according to the present invention will be explained below. FIG. 5 is a chart showing a method for controlling a power generated according to a first embodiment of the present invention. The power generated by the alternator 1 is controlled so as to be limited not over than the upper limit value Pmax regardless of the mechanical rotation speed of the rotor 1R. This power generation control is achieved in the following manner. More specifically, in order that the relative speed N is kept at the upper limit speed Nmax or less determined by the power generation upper limit value Pmax, the ACG•ECU 3 determines the speed N2 of the rotating magnetic field electrically generated in the three-phase field coil 11 of the rotor 1R in accordance with the mechanical rotation speed N1 of the rotor 1R, and then, the electrical rotating magnetic field generating section 2a generates a rotating magnetic field of the speed N2.

According to the aforesaid power generation control, for example, even in the case of setting a pulley ratio higher in accordance with a generated power required in a low rotation of engine, a current generated in a high rotation of engine can be limited. Thus, this serves to avoid a surplus design for a capacity of the wiring of power source line and the like, and couplers.

Figure 8:
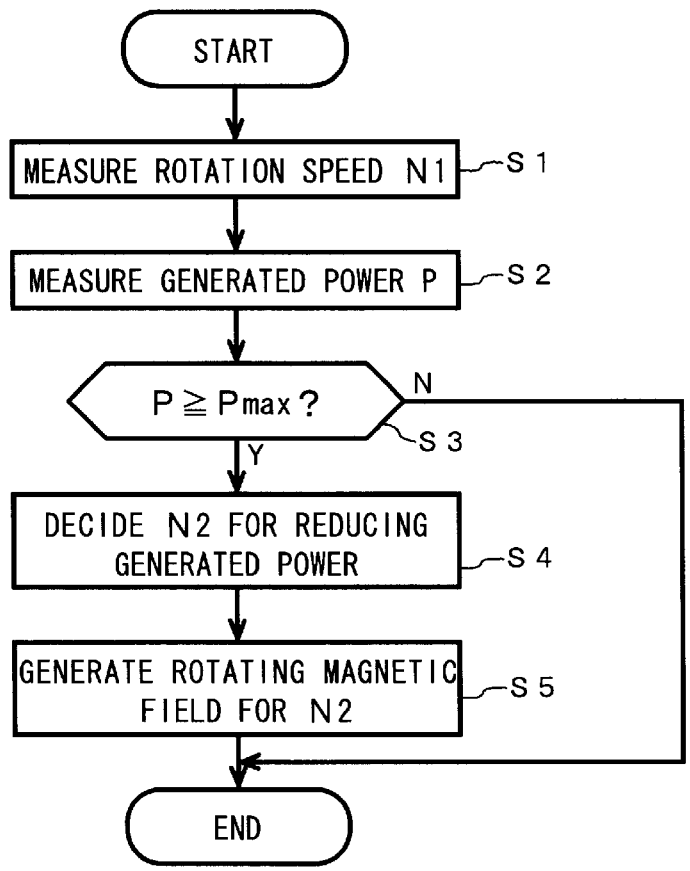
FIG. 8 is a flowchart showing a control method according to a first embodiment.
Figure 9:
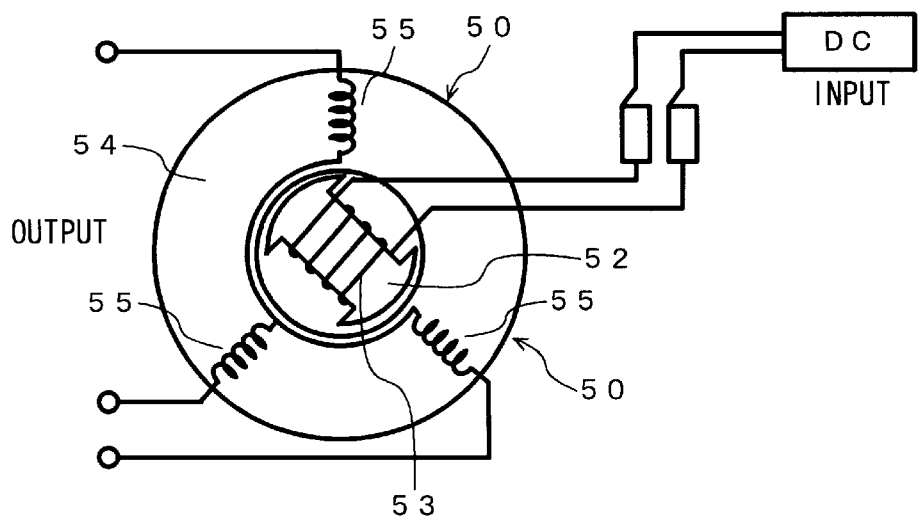
FIG. 9 is a view showing a construction of principal parts of an alternator in the prior art.

FIG. 8 is a flowchart showing an operation of the first embodiment. In step S1, a mechanical rotation speed N1 of the rotor 1R is measured. The rotation speed N1 can be computed on the basis of an engine speed Ne and a pulley ratio. In step S2, a current power P generated by the alternator is measured. In step S3, a decision is made whether or not the generated power P thus measured exceeds the upper limit value Pmax. If a decision is made that the generated power P exceeds the upper limit value Pmax, a speed N2 of the rotating magnetic field for slowing down the relative speed N to reduce the generated power P, that is, a speed N2 of the rotating magnetic field for lowering the relative speed N less than the upper limit value Nmax is calculated in step S4. In step S5, the rotating magnetic field with speed N2 is induced in the polyphase winding of the rotor.

Figure 6:
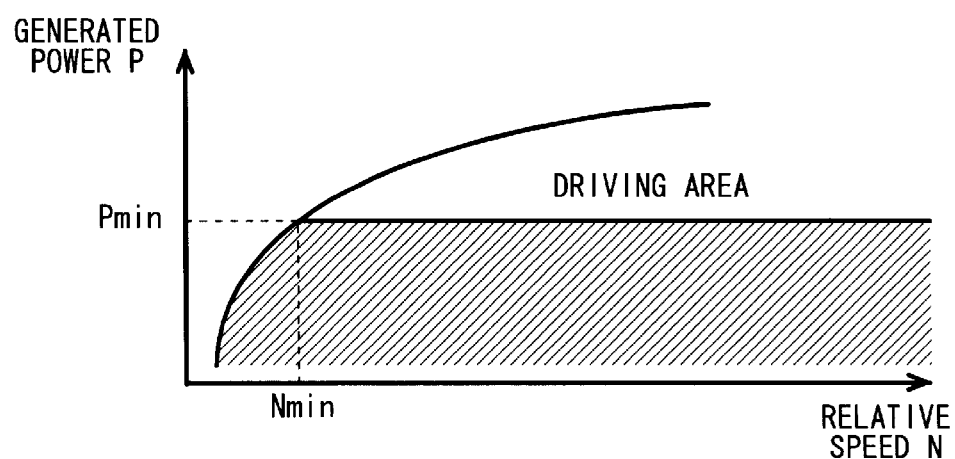

FIG. 6 is a chart showing a control method of a generated power according to a second embodiment. In the second embodiment, the power generated by the alternator 1 is controlled so as to be kept at the lower limit value Pmin or more regardless of the rotation speed N1 of the rotor 1R. The power generation control is achieved in the following manner. More specifically, in order that the relative speed N is prevented from being less than the lower limit value Nmin, the ACG•ECU 3 and the electrical rotating magnetic field generating section 2a control the speed N2 of the rotating magnetic field in accordance with the rotation speed N1 of the rotor 1R. According to the aforesaid power generation control, for example, even in the case of setting the pulley ratio lower in accordance with a electric power required at a higher rotation of engine, it is possible to prevent a shortage of generated power in a lower rotation.

Figure 7:
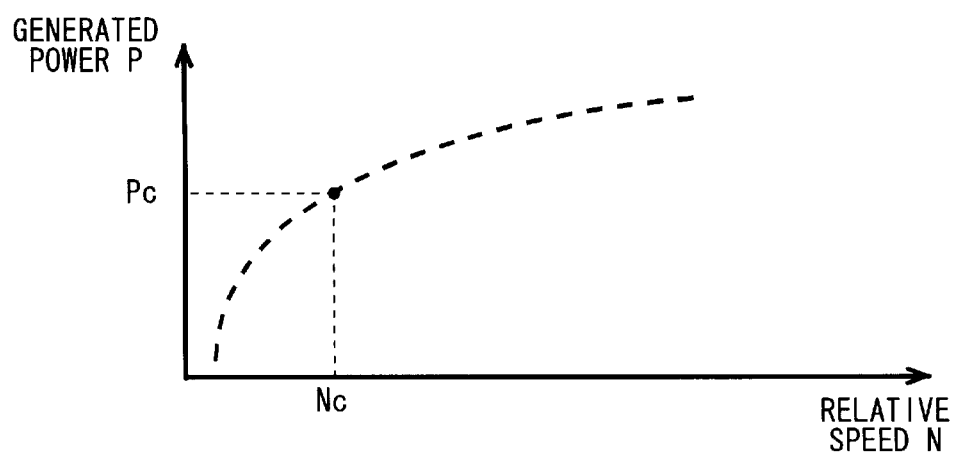

FIG. 7 is a chart showing a control method of a generated power according to a third embodiment of the present invention. In the third embodiment, the power generated by the alternator 1 is controlled so as to be kept at a target (desired) power Pc regardless of the mechanical rotation speed N1 of the rotor 1R. The power generation control is achieved in the following manner. The ACG•ECU 3 and the electrical rotating magnetic field generating section 2a control the speed N2 of the rotating magnetic field in accordance with the rotation speed N1 of the rotor 1R so that the relative speed N always coincides with a target speed Nc. According to the aforesaid power generation control, assuming that the current power consumption of the electric load is the target power Pc, a power generation control is carried out such that the power consumption and the generated power substantially coincide with each other. Thus, a voltage of battery is prevented from fluctuating, so that the lifetime of battery is expected to be elongated.

A decision is made whether or not a charging quantity of the battery is sufficient on the basis of a battery voltage. If the charging quantity is insufficient, a relatively higher value is set as the target power Pc so that charging is facilitated. On the other hand, if the charging quantity is sufficient, a relatively lower value is set as the target power Pc so that overcharge can be prevented.

Figure 10:
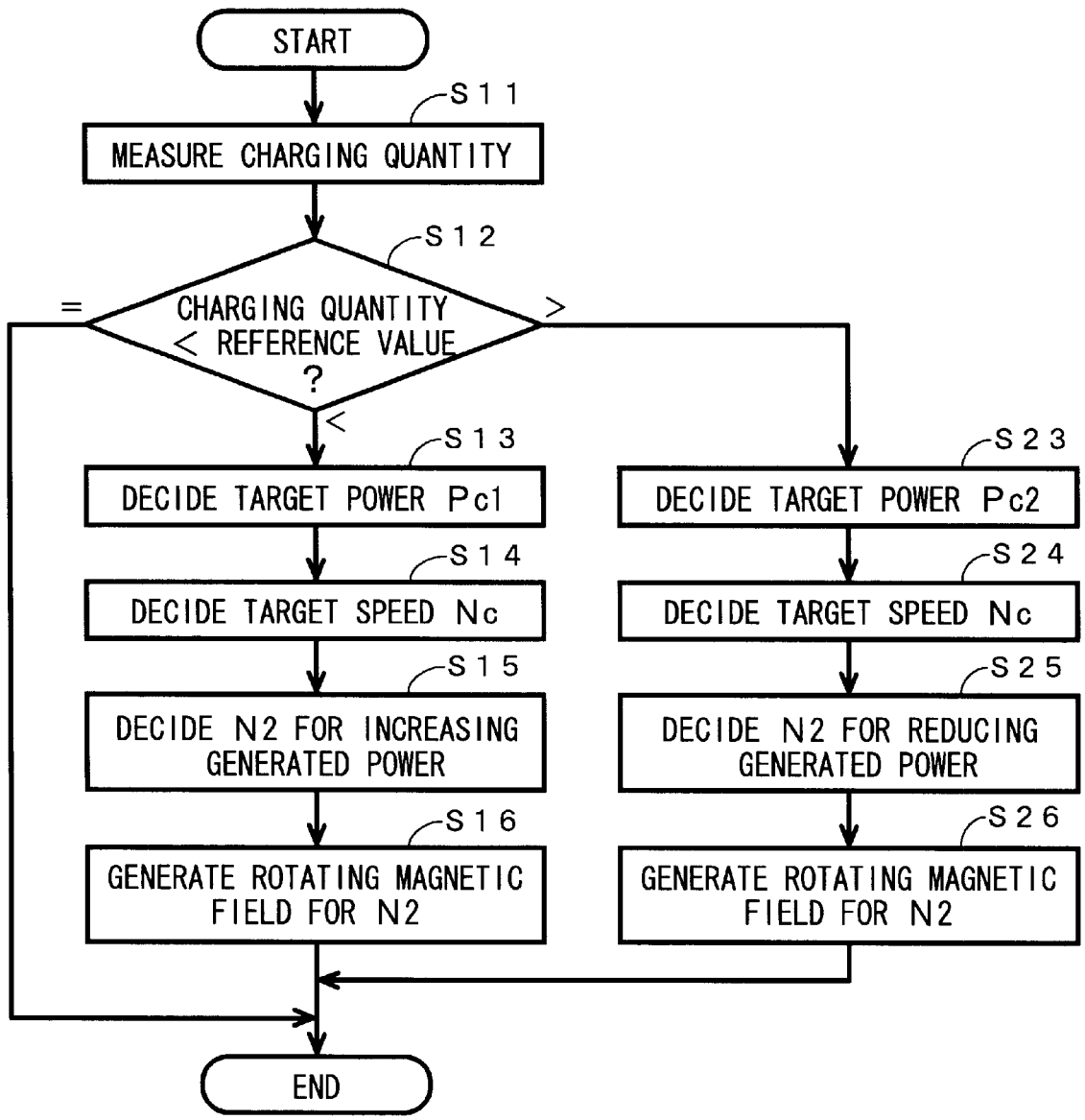
FIG. 10 is a flowchart showing a control method according to a fourth embodiment.

An operation of a fourth embodiment in which a generated power is controlled in accordance with a battery voltage, will be explained below with reference to a flowchart shown in FIG. 10. In step S11, the battery voltage representative of a charging quantity of battery is measured. In step S12, the measured battery voltage is compared with a reference value (e.g., 12.5 V). If a decision is made that the battery voltage is less than the reference value, in step S13, on the basis of the difference between the measured battery voltage value and the reference value, a target power Pc1 higher than the current value is calculated. In step S14, a target relative speed NC is calculated on the basis of the calculated target power Pc1. In step S15, the speed N2 of the rotating magnetic field for increasing the generated power up to the target power Pc1 is calculated, and then, in step S16, a rotating magnetic field of the speed N2 is generated.

If a decision is made that the battery voltage is greater than the reference value, in step S23 to step S26, the same procedures as said step S13 to Step S16 are executed except that in step S25, the speed N2 of the rotating magnetic field for decreasing the generated power to a target power Pc2 is calculated. Also, if the battery voltage is equal to the reference value, no rotating magnetic field is generated.

According to the fourth embodiment, the generated power P of the alternator is set to a predetermined value or within a predetermined range regardless of the mechanical rotation speed N1 of the rotor 1R. Thus, even in the case of setting a pulley ratio higher so that a required power is generated at a low rotation of engine, it is possible to prevent surplus power generation at a high rotation. Further, even in the case of setting a pulley ratio lower so that the required power is generated at a high rotation of engine, it is possible to prevent a shortage of generated power at a low rotation. By setting the target power Pc to a proper value, the lifetime of battery can be made long, charging can be rapidly performed when the charging quantity of battery is short, and it is possible to prevent overcharge.

Figure 11:
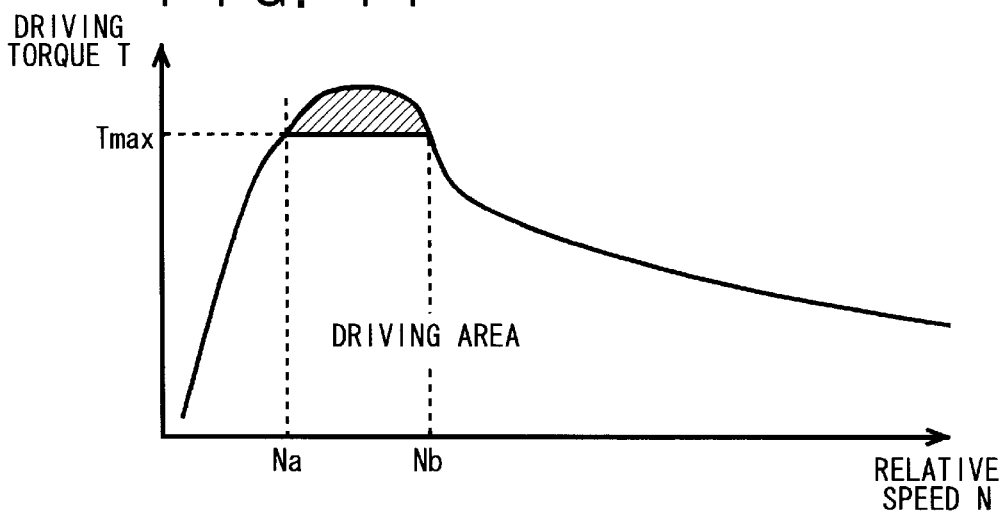
FIGS. 11, 12 and 13 are charts to respectively show a method for controlling a driving torque according to the present invention.

Next, an embodiment of a driving torque control according to the present invention will be explained below. FIG. 11 is a chart showing a control method of a driving torque according to a fifth embodiment of the present invention. In the fifth embodiment, a driving torque of the alternator 1 is controlled so as to be limited to the upper limit torque Tmax or less regardless of the mechanical rotation speed N1 of the rotor 1R. The torque control is achieved in the following manner. More specifically, in order that the relative speed N is kept equal to or less than a low-speed side upper limit value Na or more than a high-speed side lower limit value Nb both of which are determined corresponding to the upper limit torque Tmax, the speed N2 of the rotating magnetic field electrically generated in the three-phase winding of the rotor 1R is controlled in accordance with the rotation speed N1 of the rotor 1R.

Figure 14:
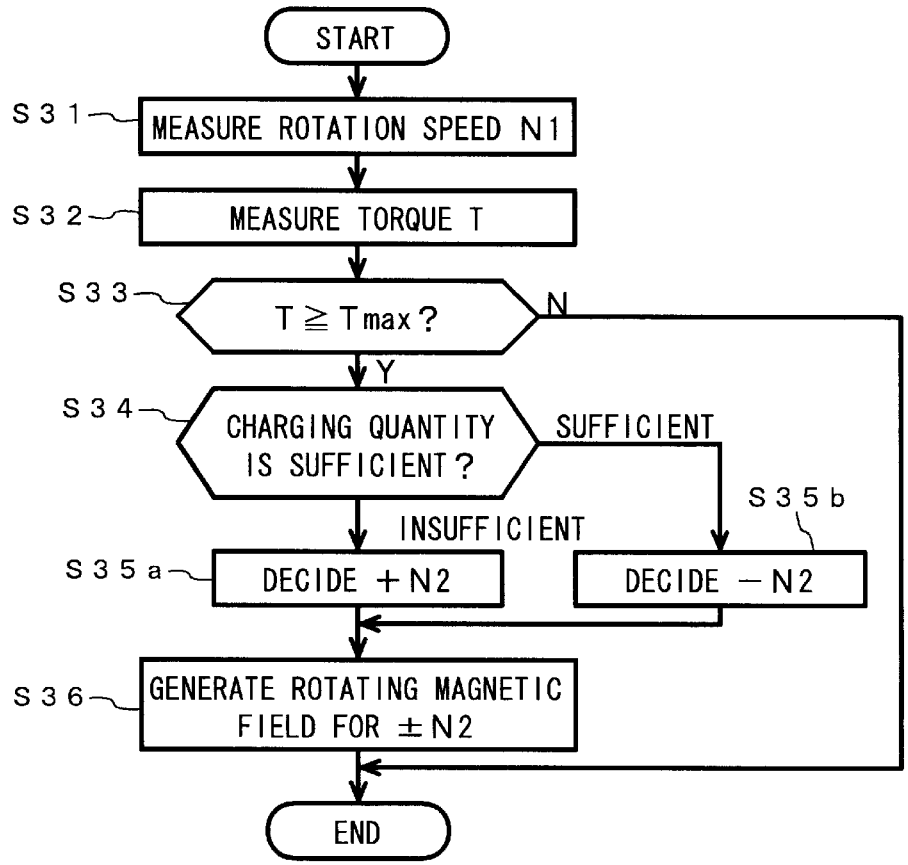
FIG. 14 is a flowchart showing a control method according to a fifth embodiment.

FIG. 14 is a flowchart showing an operation of the fifth embodiment. In step S31, the rotation speed N1 of the rotor 1R is measured. In step S32, a current driving torque T of the alternator is measured. The driving torque T may be measured with a torque meter, and also, can be measured by measuring an output current and/or an exciting current of the alternator 1.

In step S33, a decision is made whether or not the measured driving torque T exceeds the upper limit torque Tmax. If a decision is made that the driving torque T exceeds the upper limit torque Tmax, in step S34, a battery charging quantity is detected on the basis of the battery voltage. A power M generated by the alternator increases together with a rise of the relative speed N. Considering this matter, in this embodiment, if a decision is made in step S34 that the charging quantity is insufficient (for example, the battery voltage is equal to or less than 12.5 V), a speed of the rotating magnetic field for reducing the driving torque T by increasing the relative speed N, that is, a speed +N2 of the rotating magnetic field for setting the relative speed N equal to or more than the high-speed side lower limit value Nb is calculated in step S35a. On the other hand, if a decision is made in step S34 that the battery charging quantity is sufficient (for example, the battery voltage is equal to or more than 12.5 V), a speed of the rotating magnetic field for reducing the driving torque T by reducing the relative speed N, that is, a speed −N2 of the rotating magnetic field for setting the relative speed N less than the low-speed side upper limit value Na is calculated in step S35b. In step S36, a rotating magnetic field of the speed N2 is induced in the polyphase winding of the rotor.

Figure 12:
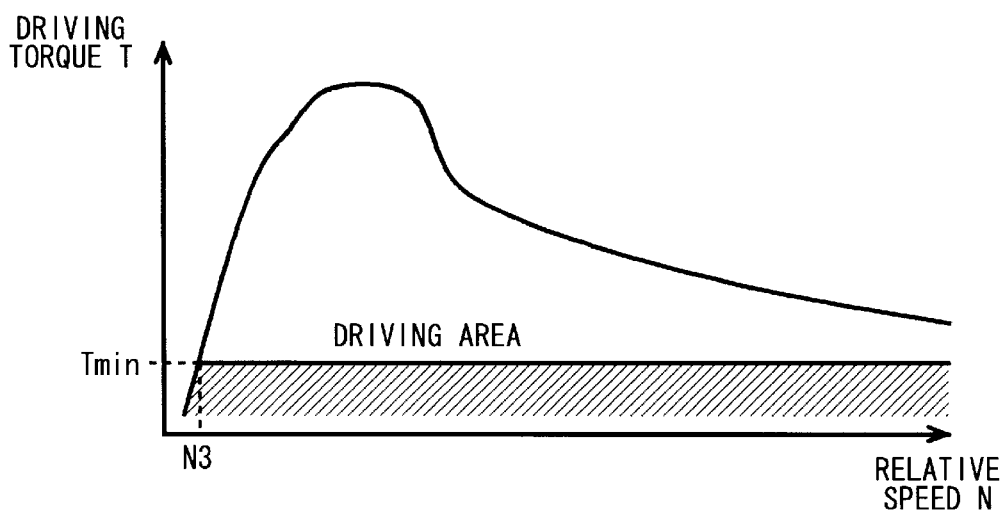

FIG. 12 is a chart showing a control method of a driving torque according to a sixth embodiment of the present invention. In the sixth embodiment, the driving torque of the alternator 1 is controlled so as to be kept equal to or more than a lower limit torque Tmin regardless of the rotation speed N1 of the rotor. The torque control is achieved in the manner in which the speed N2 of the rotating magnetic field is controlled in accordance with the rotation speed N1 of the rotor 1R so that the relative speed N is not less than a lower limit value N3.

Figure 13:
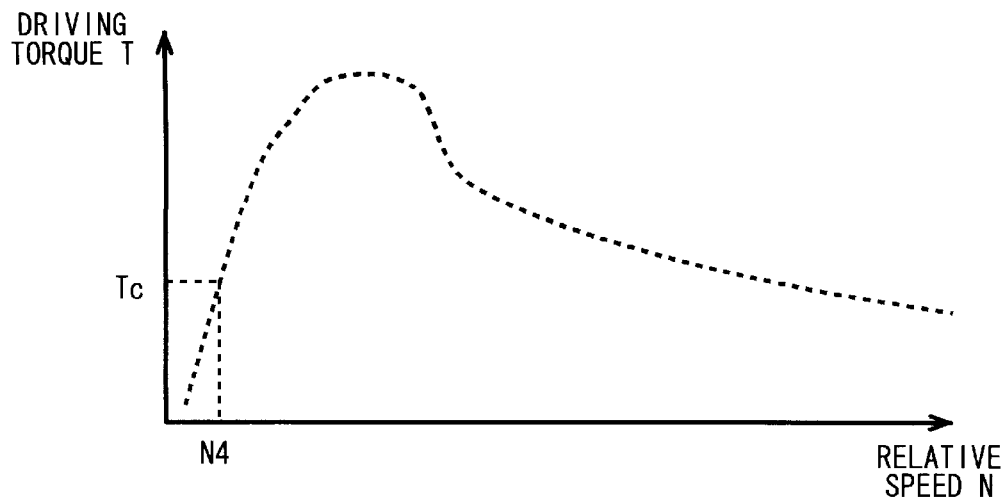

FIG. 13 is a chart showing a control method of a driving torque according to a seventh embodiment of the present invention. In the seventh embodiment, the driving torque of the alternator is controlled so as to be kept at a constant (fixed) torque Tc regardless of the rotation speed N1 of the rotor. The torque control is achieved in the following manner in which the speed N2 of the rotating magnetic field is controlled in accordance with the rotation speed N1 of the rotor 1R so that the relative speed N always coincides with a target speed N4.

According to this embodiment, the driving torque T of the alternator is controlled to a desired and predetermined value or within a predetermined range. Thus, it is possible to prevent excessively increased and decreased load on the alternator belt or a large fluctuation in the load, and also, it is possible to prevent a fluctuation in a rotation speed of engine.

In the aforesaid each control method of the driving torque, the driving torque of the alternator is controlled to an arbitrarily absolute range or value. The driving torque may be made higher and lower than the current driving torque, and in this manner, a relative control may be carried out on the basis of the current driving torque. For example, the speed of the rotating magnetic field may be controlled so that the driving torque of the induction machine is increased or decreased from the current driving torque in accordance with vehicle running states.

Figure 15:
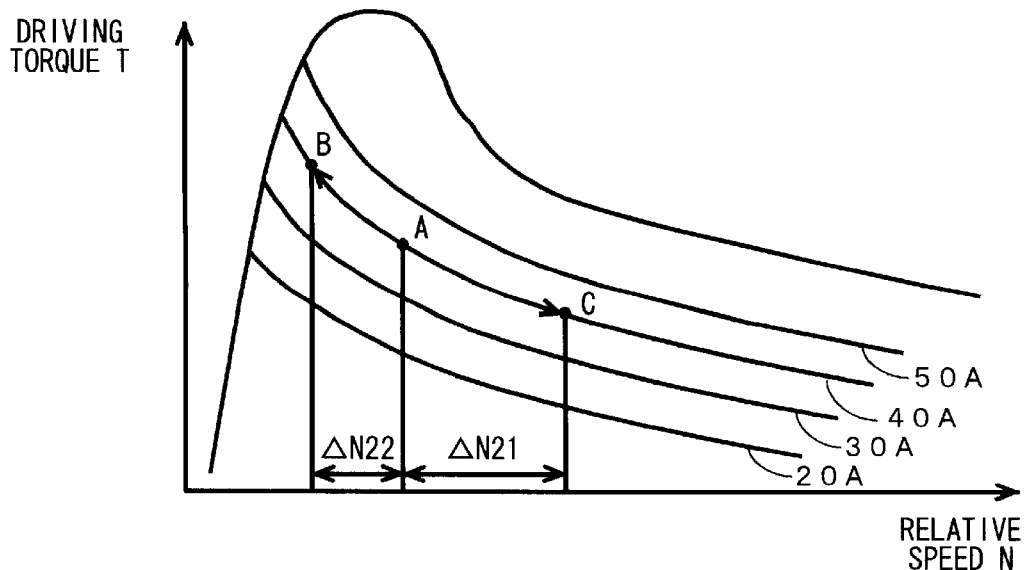
FIG. 15 is a chart to explain a control method according to an eighth embodiment.

More specifically, according to an eighth embodiment of the present invention shown in FIG. 15, when an acceleration of the vehicle is detected on the basis of an accelerator opening and/or a rotation speed of the engine, at an operating point A on a 40A electric load line, the speed N2 of the rotating magnetic field is increased by ΔN21 to increase the relative speed N, and thereby, the operating point is transferred to an operating point C so that the driving torque is made low. When the engine brake state of the vehicle is detected, the speed N2 of the rotating magnetic field is decreased by ΔN22 to decrease the relative speed N, and thereby, the operating point is transferred to the operating point B so that the driving torque is made high. Thus, the accelerating performance or the engine braking performance can be improved.

Figure 16:
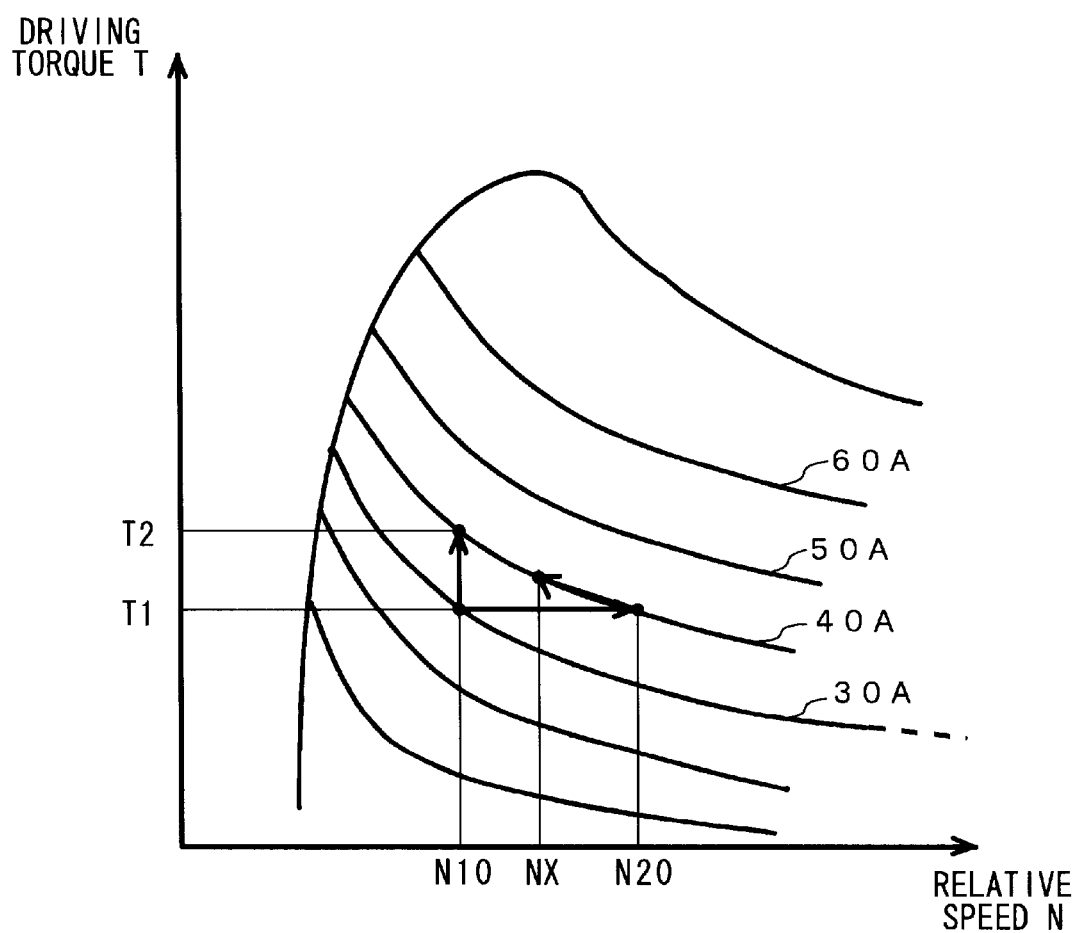
FIG. 16 is a chart to explain a control method according to a ninth embodiment.

Subsequently, a ninth embodiment of the present invention will be described below. In the aforesaid fifth through eighth embodiments, the electric load on the alternator 1 has not been taken into consideration. Actually, the electric load greatly varies by turning on/off an air conditioner, a head lump or the like. If the electric load is different, the relationship between the relative speed N and the driving torque T of the alternator 1 varies. FIG. 16 is a chart showing the relationship between the relative speed N and the driving torque T of the alternator 1 using the electric load as a parameter. It can be seen from the chart that even if the relative speed N is constant, when the electric load increases, the driving torque T increases.

If the electric load increases to 40A when a power of 30A is generated at a relative speed N10, the driving torque naturally increases from T1 to T2. For this reason, a shock corresponding to the torque fluctuation is caused on the vehicle, and the rotation speed of engine can temporarily lower due to the increase of the driving torque. In the ninth embodiment, when the driving torque is likely to vary due to the increase or decrease of electric load, the increase or decrease of electric load is compensated by increase or decrease of the relative speed N, and thereby, the fluctuation of torque can be prevented. More specifically, if the electric load increases to 40A when a power of 30A is generated at a relative speed N10, the speed N2 of the rotating magnetic field is increased so that the relative speed N is increased from N10 to N20. As a result, it is possible to increase the generated power from 30A to 40A with keeping the driving torque constant.

Figure 17:
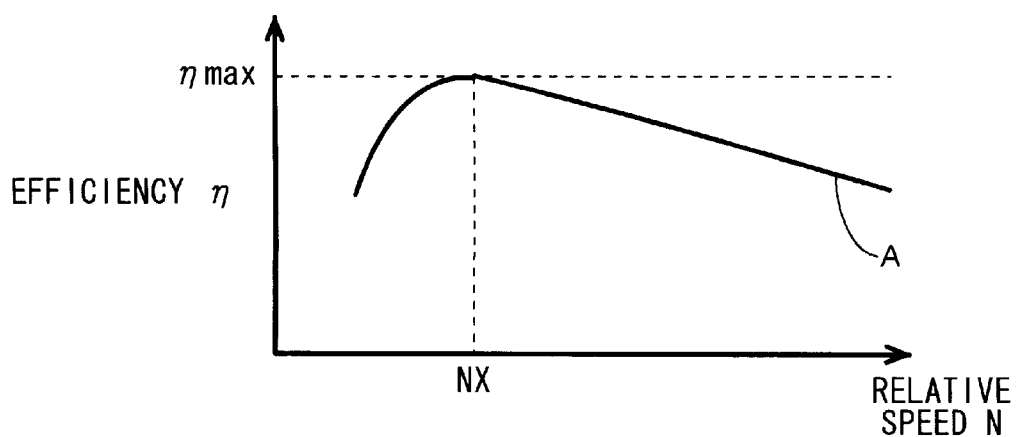
FIG. 17 is a graph showing a relationship between a relative speed N of the rotating magnetic field and an efficiency η.

Further, a relationship between the relative speed N of the alternator and a power generation efficiency η is as shown in FIG. 17 in which the maximum efficiency η max is shown at a certain point Nx of the relative speed N, and as the relative speed N separates from the maximum efficiency rotation speed Nx, the power generation efficiency η is gradually reduced. Therefore, it is desirable that the relative speed N is kept at the rotation speed Nx for the maximum efficiency η max.

In the ninth embodiment, when the increase or decrease of the electric load, that is, an event varying the driving torque of the alternator occurs, at first, the speed N2 of the rotating magnetic field electrically generated in the polyphase winding of the rotor is varied so as to control the relative speed N in order to compensate the fluctuation of the electric load without varying the driving torque. Thereafter, with keeping the generated power constant, the speed N2 of the rotating magnetic field is gradually adjusted so that the relative speed N coincides with the maximum efficiency rotation speed Nx accompanying with the variation of driving torque. At this time, it is desirable that the control of the speed N2 or N is gradually carried out the following manner. More specifically, the control is gradually carried out at a moderate speed such that a sudden shock does not act onto the alternator belt and/or the fluctuation of driving torque is not felt by a driver.

According to the ninth embodiment, even if the event such as an increase and decrease is caused in the engine speed or electric load to vary the driving torque of the alternator, it is possible to cope with the event without sudden variation in the driving torque of the alternator.

Figure 18:
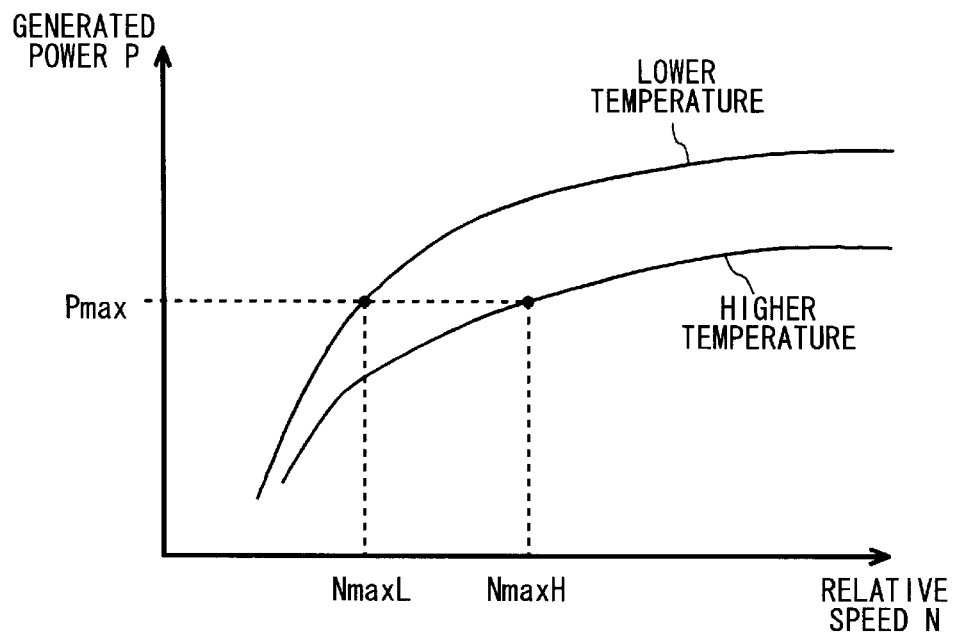
FIG. 18 is a graph showing a relationship between a relative speed N of rotating magnetic field and a generated power P with parameter of the temperature of the alternator.

Meanwhile, as a temperature of the alternator lowers, an electrical resistance of the polyphase winding lowers, and the exciting current increases. For this reason, as shown in FIG. 18, at a particular relative speed, a generated power is more at a higher temperature that at a lower temperature. Therefore, for example, in the case of controlling the generated power of the alternator equal to or less than the upper limit value Pmax, the upper limit value of the relative speed N is NmaxH at a higher temperature, while it is NmaxL at a lower temperature.

Figure 19:
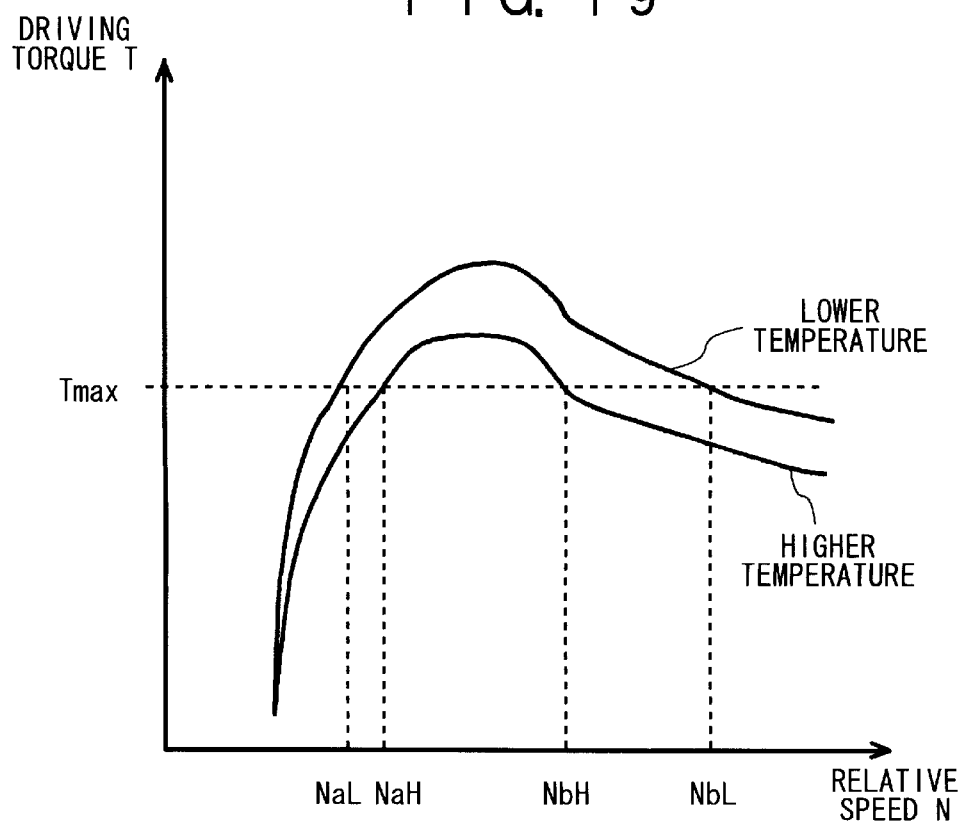
FIG. 19 is a chart showing the relationship between a relative speed N of rotating magnetic field and a driving torque T using a temperature of the alternator as a parameter.

Also, as shown in FIG. 19, the driving torque at the same relative speed becomes high when the alternator has a low temperature as compared with when it has a high temperature. Therefore, for example, in the case of controlling the driving torque of the alternator equal to or less than the upper limit value Tmax, the low-speed side upper limit value and the high-speed side lower limit value of the relative speed N are NaH and NbH when the alternator has a high temperature, and are NaL and NbL when the alternator has a low temperature.

Therefore, as described above, in the case of controlling the generated power P or the driving torque T of the alternator to a target value or within a target range on the basis of the relative speed N, it is desirable that the temperature of the alternator 1 is used as a parameter, and the relationship between the relative speed N and the generated power P and the relationship between the relative speed N and the driving torque T are previously defined.

Although the above embodiments took the induction machine including three-phase windings type rotor and stator by way of example to describe the present invention, the present invention is not limited by the embodiments and any other poly-phase windings such as four- and five-phase windings may be used in the same manner.

Industrial Applicability

According to the present invention, the following advantages are obtained.

(1) The power generated by the alternator is controlled within a predetermined range regardless of the engine speed. Thus, even in the case where the pulley ratio is set higher so that a required power is generated when the engine rotates at a lower speed, it is possible to prevent overcharge during the high rotation of the engine and surplus wiring or the like. Further, even in the case where the pulley ratio is set lower so that the required power is generated when the engine rotates at a higher speed, it is possible to prevent a shortage of the generated power during the low rotation of the engine.

(2) The power generated by the alternator can be set to a predetermined target value regardless of the engine speed. Thus, charging is quickly performed when the charging quantity of battery is short, and it is possible to prevent overcharge, so that the lifetime of battery can be made long. More specifically, the generated power is kept at the predetermined value or more, so that the shortage of the generated power can be prevented. Further, the generated power is kept at the predetermined value or less, so that a charging current can be limited. Furthermore, the generated power is kept at the predetermined value, so that the battery voltage can be prevented from varying and the lifetime of battery can be made long.

(3) The driving torque of the alternator is kept within a predetermined range regardless of the rotation speed of engine. Thus, it is possible to prevent an excessive increase, decrease and fluctuation in a load acting on the alternator belt.

(4) The driving torque of the alternator is set within a predetermined target value regardless of the rotation speed of engine. Thus, even in the case where the event varying the driving torque of the induction machine occurs, it is possible to control the driving torque of the induction machine within a predetermined range. More specifically, if the driving torque is set so as to be kept at a predetermined value or more, the fluctuation of the load acting onto the alternator belt is prevented, so that mechanical vibration and noise can be reduced. Further, if the driving torque is set so as to be kept at a predetermined value or less, excessive load on the alternator belt can be prevented. Furthermore, driving torque is set so as to be kept at a desired predetermined value, it is possible to prevent both fluctuation of load acting on the alternator belt and excessive load acting thereon.

(5) As the speed of the rotating magnetic field is controlled as a function of the temperature, it is possible to accurately control the generated power and the driving torque regardless of the temperature of the induction machine.

(6) The speed of the rotating magnetic field is controlled so that the power generated by the induction machine is not less than power consumed by the electric load. Thus, it is possible to prevent a shortage of generated power regardless of a fluctuation of the electric load.

(7) The speed of the rotating magnetic field is controlled in accordance with the vehicle running states. For example, when the vehicle is braked, the speed of the rotating magnetic field is controlled so that the driving torque of the induction machine increases, while when the vehicle is accelerated, the speed of the rotating magnetic field is controlled so that the driving torque of the induction machine decreases. Thus, in the braking state, the engine brake performance is improved, and in accelerating, accelerating performance is improved.

(8) When the electric load varies, the speed of the rotating magnetic field is controlled so that the electric load after varied is compensated without causing a fluctuation of driving torque. Thereafter, the rotating magnetic field control with the variation of a driving torque is gradually carried out so that the relative speed of the rotating magnetic field with respect to the stator is compensated by a predetermined rotation speed. Thus, even if the electric load increases or decreases, it is possible to carry out an ideal power control so that a driver does not feel the fluctuation of driving torque.

(9) The predetermined rotation speed is set to a rotation speed within a range where the power generation efficiency of the induction machine is the maximum so that an effective power generation is possible.

What is claimed is:

1. A generator system for an internal combustion engine comprising:

an induction machine which includes a rotor and a stator each having a polyphase winding, the rotor being rotated by transmitting a rotating motion of an internal combustion engine which is operated at variable speeds;

rotating magnetic field generating means for electrically generating a rotating magnetic field in the rotor; and control means for controlling a speed of the rotating magnetic field in the rotor, wherein the control means sets a target value of a relative speed of the rotating magnetic field with respect to the stator, and controls a speed of the rotating magnetic field on the basis of the target value and a rotation speed of the rotor, and wherein the control means sets the target value so that a power generated by the induction machine is within a predetermined range, and controls a speed of the rotating magnetic field in accordance with a rotation speed of the rotor.

2. The generator system for an internal combustion engine according to claim 1, wherein the control means sets the target value so that the power generated by the induction machine is not less than power consumed by an electric load.

3. A generator system for an internal combustion engine comprising:

an induction machine which includes a rotor and a stator each having a polyphase winding, the rotor being rotated by transmitting a rotating motion of an internal combustion engine which is operated at variable speeds;

rotating magnetic field generating means for electrically generating a rotating magnetic field in the rotor; and control means for controlling a speed of the rotating magnetic field in the rotor, wherein the control means sets a target value of a relative speed of the rotating magnetic field with respect to the stator, and controls a speed of the rotating magnetic field on the basis of the target value and a rotation speed of the rotor, and wherein the control means sets the target value so that a driving torque of the induction machine is within a predetermined range, and controls a speed of the rotating magnetic field in accordance with a rotation speed of the rotor.

4. The generator system for an internal combustion engine according to claim 3, wherein the control means sets the target value so that a power generated by the induction machine is kept at any one of a predetermined value or more, the predetermined value or less and the predetermined value, and controls the speed of the rotating magnetic field.

5. The generator system for an internal combustion engine according to claim 3, wherein the control means sets the target value so that a driving torque of the induction machine is kept at any one of a predetermined value or more, the predetermined value or less and the predetermined value, and controls the speed of the rotating magnetic field.

6. The generator system for an internal combustion engine according to claim 3, wherein the control means sets the target value in accordance with running states of vehicle which is equipped with the generator system.

7. The generator system for an internal combustion engine according to claim 6, wherein the control means sets the target value so that the driving torque of the induction machine increases when the vehicle is in a braking state.

8. The generator system for an internal combustion engine according to claim 6, wherein the control means sets the target value so that the driving torque of the induction machine decreases when the vehicle is in an accelerating state.

9. The generator system for an internal combustion engine according to claim 3, wherein when an electric load varies, the control means sets a temporary target value so that the electric load after being varied is powered without causing a variation of the driving torque, and controls the speed of the rotating magnetic field accordingly, and thereafter, sets a final target value of the relative speed so that the electric load after being varied is powered with a different driving torque from that corresponding to the temporary target value, and then, gradually carries out a power generation control with the variation of driving torque using the final target value.

10. The generator system for an internal combustion engine according to claim 9, wherein the final target value is within a range where the power generation efficiency of the induction machine is a maximum.

11. A generator system for an internal combustion engine comprising:

an induction machine which includes a rotor and a stator each having a polyphase winding, the rotor being rotated by transmitting a rotating motion of an internal combustion engine which is operated at variable speeds;

rotating magnetic field generating means for electrically generating a rotating magnetic field in the rotor; and control means for controlling a speed of the rotating magnetic field in the rotor, wherein the control means sets a target value of a relative speed of the rotating magnetic field with respect to the stator, and controls a speed of the rotating magnetic field on the basis of the target value and a rotation speed of the rotor, and wherein the control means sets the target value of the relative speed as a function of a temperature of the induction machine.

12. The generator system for an internal combustion engine comprising:

an induction machine which includes a rotor and a stator each having a polyphase winding, the rotor being rotated by transmitting a rotating motion of an internal combustion engine which is operated at variable speeds;

rotating magnetic field generating means for electrically generating a rotating magnetic field in the rotor; and control means for controlling a speed of the rotating magnetic field in the rotor, wherein the control means sets a target value of a relative speed of the rotating magnetic field with respect to the stator, and controls a speed of the rotating magnetic field on the basis of the target value and a rotation speed of the rotor, and wherein the control means sets a relative speed as the target value which is greater than a current relative speed if a charging quantity of a battery charged by the induction machine is insufficient, and sets a relative speed which is less than the current relative speed if the charging quantity of the battery is insufficient.

* * * * *